United States Patent [19]

Swidler

[11] Patent Number: 4,931,067
[45] Date of Patent: Jun. 5, 1990

[54] METHOD OR DYEING USING PHASE CHANGE DYESTUFFS

[75] Inventor: Ronald Swidler, Palo Alto, Calif.

[73] Assignee: SRI International, Menlo Park, Calif.

[21] Appl. No.: 32,068

[22] Filed: Mar. 27, 1987

[51] Int. Cl.$^5$ .......................... D06P 1/04; D06P 1/22; D06P 1/41; D06P 1/42
[52] U.S. Cl. ............................................ 8/657; 8/658; 8/661; 8/662; 8/672; 8/675; 8/688; 8/690; 8/691; 8/692; 534/636; 534/798; 534/803
[58] Field of Search ................. 534/803, 798; 8/636, 8/657, 658, 661, 662, 688, 672, 675, 690, 691, 692

[56] References Cited

U.S. PATENT DOCUMENTS

| | | | |
|---|---|---|---|
| 1,667,312 | 4/1928 | Fritsche et al. | 534/803 X |
| 2,036,196 | 4/1936 | Chappell et al. | 8/5 |
| 2,643,996 | 6/1953 | Widmer et al. | 534/803 |
| 2,843,448 | 7/1958 | Thummel et al. | 8/57 X |
| 2,950,949 | 8/1960 | Schlack | 8/55 X |
| 3,110,710 | 11/1963 | Rattee et al. | 534/803 |
| 3,163,635 | 12/1964 | Riat et al. | 534/803 X |
| 3,177,214 | 4/1965 | Sulzer et al. | 534/803 X |
| 3,252,749 | 5/1966 | Mautner | 8/55 X |
| 3,453,255 | 7/1969 | Doss | 534/638 |
| 3,480,378 | 11/1969 | Taube et al. | 8/39 X |
| 3,658,783 | 4/1972 | Knobloch et al. | 534/803 |
| 3,934,972 | 1/1976 | Greenhalgh et al. | 8/39 X |
| 3,936,437 | 2/1976 | Fishwick et al. | 534/572 X |
| 3,953,162 | 4/1976 | Greenhalgh et al. | 534/39 B |
| 3,958,933 | 5/1976 | Graff et al. | 8/165 |
| 3,964,862 | 6/1976 | Kangle et al. | 8/176 |
| 4,179,435 | 12/1979 | Ramanathan | 534/847 X |
| 4,363,761 | 12/1982 | Pedrazzi | 534/803 |
| 4,550,158 | 10/1985 | Doswald et al. | 534/803 X |
| 4,594,410 | 6/1986 | Pedrazzi | 534/803 X |
| 4,664,714 | 5/1987 | Katsura et al. | 534/803 X |

FOREIGN PATENT DOCUMENTS

| | | | |
|---|---|---|---|
| 0187520 | 7/1986 | European Pat. Off. | 534/803 |
| 2814802 | 10/1978 | Fed. Rep. of Germany | 534/803 |
| 1391031 | 1/1965 | France | 534/803 |
| 2198980 | 5/1974 | France | 534/852 |
| 2204661 | 5/1974 | France | 534/852 |
| 60-188468 | 9/1985 | Japan | 534/803 |
| 7200657 | 7/1972 | Netherlands | 534/803 |
| 922403 | 4/1963 | United Kingdom | 534/803 |

*Primary Examiner*—Floyd D. Higel
*Attorney, Agent, or Firm*—Fliesler, Dubb, Meyer & Lovejoy

[57] ABSTRACT

Method is set forth of dyeing a material comprising forming a solution having a basic salt of a water soluble dye of the formula:

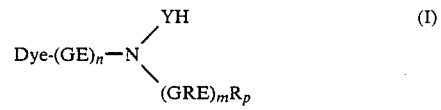

wherein
n is 0 or 1;
m is 0 or 1;
m=1 when n=0;
p=0 when m=1;
p=1 when m=0;
the subscripts 1 and 0 indicating, respectively, the presence and absence of the substituent subscripted;
Y is $CR_2COO$, $CR_2CR_2COO$ or $CR_2CR_2CR_2COO$;
each R is independently hydrogen, methyl, ethyl, phenyl or phenyl substituted with methyl, ethyl, halo, cyano, ethynyl or nitro;
G is $CR$, $CR_2CR$, $CRCR_2$, $CR_2CR_2CR$, $CR_2CRCR_2$ or $CRCR_2CR_2$;
E is OH, SH or $NH_2$;
when G of GE includes more than one carbon atom the substituent E is attached to a carbon atom selected such that the two end carbon atoms of G are attached, one to the Dye and the other to the nitrogen; and
Dye indicates a color imparting moiety;

positioning the aqueous solution adjacent to a material; and applying sufficient dry heat to the material to convert the dye to a hydrophobic form thereof having the formula:

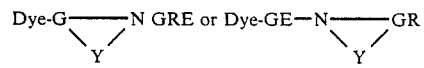

when n = 1, and m = 1 and p = 0;

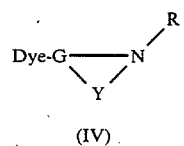

when n = 1, m = 0 and p = 1; and

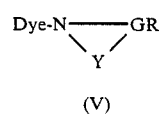

when n = 0, m = 1 and p = 0.

Also set forth are certain novel dyestuffs of the formulas (II), (III), (IV) and (V) including, in particualr, dyestuffs of the formula:

(Abstract continued on next page.)

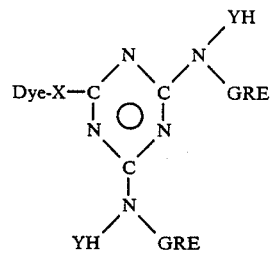
(VI)
wherein X is O, S or NH
along with a method of synthesizing dyestuffs of the formula (VI).
7 Claims, No Drawings
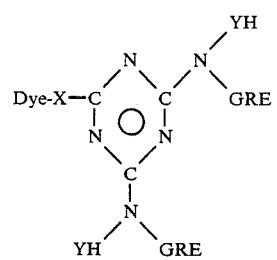
(VI)
wherein X is O, S or NH
along with a method of synthesizing dyestuffs of the formula (VI).
7 Claims, No Drawings

METHOD OR DYEING USING PHASE CHANGE DYESTUFFS

TECHNICAL FIELD

The present invention relates to a novel method of dyeing and to novel dyestuffs.

BACKGROUND ART

Hydrophobic polymeric textile fibers are generally dyed with dispersed particulate hydrophobic dye colorants by application of dry heat or exhaustion. The dye enters the fiber matrix under these conditions with efficiencies ranging from 75 to 100%. The surface dye must be removed completely so that colorant rub-off (crocking) does not occur in use. This requires considerable aggressive washing in the plant as the dyes are generally quite hydrophobic. This is a costly and water intensive step. And, removal of the generally very hydrophobic dye material is not always as complete as would be desired because of its relatively low solubility in water.

Cotton fabric can be vat dyed by reducing the vat dye to a water soluble form, applying the reduced dye to cotton where it adsorbs, and then oxidizing the dye, generally with very dilute hydrogen peroxide, to a water insoluble form which is entrapped or ingrained into the fabric. Vat dyeing is an expensive process requiring that considerable care be taken. The process is characterized by unpleasant odors and the dyes which may be used are relatively limited.

Methods of dyeing whereby great numbers of dyes can be readily converted in a controlled manner between hydrophobic and hydrophilic forms, and dyes having such a property, would be of great practical use.

DISCLOSURE OF INVENTION

The present invention is directed to solving the problem set forth above.

In accordance with one embodiment of the present invention a method is set forth of dyeing a material comprising forming a solution having a basic salt of a water soluble dye dissolved therein, the dye having the formula:

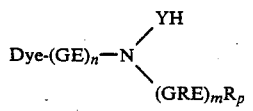

(I)

wherein:
n is 0 or 1;
m is 0 or 1;
m = 1 when n = 0;
p = 0 when m = 1;
p = 1 when m = 0;
the subscript 1 indicates the presence and the subscript 0 the absence of the substituent subscripted;
Y is $CR_2COO$, $CR_2CR_2COO$ or $CR_2CR_2CR_2COO$;
each R is independently hydrogen, methyl, ethyl, phenyl or phenyl substituted with methyl, ethyl, halo, cyano, ethynyl or nitro;
G is CR, $CR_2CR$, $CRCR_2$, $CR_2CR_2CR$, $CR_2CRCR_2$ or $CRCR_2CR_2$;
E is OH, SH or $NH_2$;
when G of GE includes more than one carbon atom the substituent E is attached to a carbon atom selected such that the two end carbon atoms of G are attached, one to the
Dye and the other to the nitrogen; and
Dye indicates a color imparting moiety;
positioning the aqueous solution adjacent to a material; and applying sufficient dry heat to the material to convert the dye to a hydrophobic form thereof having the formula:

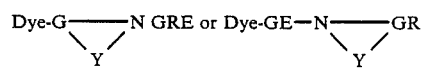

(II)                    (III)

when n = 1, and m = 1 and p = 0;

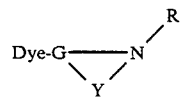

(IV)

when n = 1, m = 0 and p = 1; and

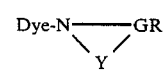

(V)

when n = 0, m = 1 and p = 0.

In accordance with another embodiment of the present invention a dyestuff is provided of the formula:

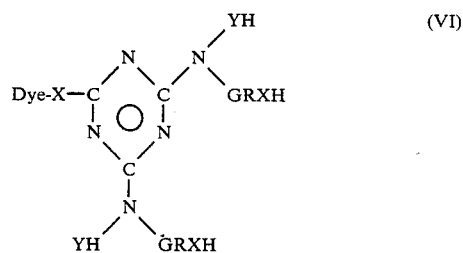

(VI)

wherein each of Y, G, R, E and Dye is as previously defined and X is O, S or NH.

In accordance with still another embodiment of the present invention a dyestuff is provided of the formula:

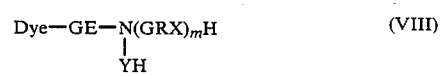

(VIII)

wherein G, E, R, X, Y, Dye and m are as previously defined.

Another embodiment yet of the invention is a dyestuff of the formula:

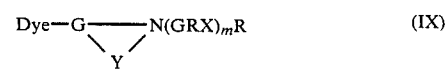

(IX)

wherein G, R, X, Dye and m are as previously defined.

Operation in accordance with the present invention allows a multitude of different dyes to be used to dye a hydrophobic material (or cotton of the like) and allows any excess dye to be readily washed out of the material.

BEST MODE FOR CARRYING OUT INVENTION

In accordance with the present invention a method is set forth of dyeing a material wherein the dye is represented by the formula (I). An aqueous solution of a dye of formula (I) is placed adjacent to a material, usually a hydrophobic material, and sufficient dry heat is applied to the material to convert the dye to a hydrophobic form thereof having one or more of the formulas (II), (III), (IV) or (V).

In essence, a lactone or lactone like or morpholone or morpholone like ring of 5, 6 or 7 atoms, preferably of 6 atoms, is formed thereby converting the originally water soluble dye into a water insoluble (lactone or lactone like or morpholone or morpholone like) form. The dye penetrates the material and becomes substantially completely protected thereby from subsequent contact with base as in a washing cycle. Some of the dye may remain on the surface even though it is converted to the water insoluble form. The surface dye can be removed by washing with a basic solution whereby the water (aqueous alkali) insoluble form on the surface of the hydrophobic material is converted back to an acid-alcohol or acid-alcohol like form. Since this form is soluble in aqueous alkali it is easily removed by washing. The non-surface portion of the dye is protected by the fabric from conversion back to the aqueous alkali soluble form.

The dyestuffs of the present invention are also useful for dyeing cotton since they can be readily converted from hydrophilic to hydrophobic form. This allows them to be ingrained as are conventional vat dyes. In such uses it is desirable that the ring structure of the hydrophobic form has at least one and preferably at least two of its R groups as other than hydrogen. Particularly suitable in this respect is one gem dimethyl ring atom, preferably beta to the carbonyl. The presence of the non-hydrogen R groups leads to the hydrophobic form being much harder to hydrolyze into the hydrophilic form.

The dye portion of the molecule can be virtually any dye which can be attached to the $(GE)_n$ or nitrogen (when n =0). For example, the dye may be an azo dyestuff of the thiazole, benzthiazole, isothiazole, benzisothiazole, 1,3,4-thiadiazole, 1,3,5-thiadiazole, pyrazole, indazole, pyridine, or thiophene type. Also, the dye can be a negatively substituted aminobenzene, including negatively substituted anions. The various anthraquinone dyes may also serve as the dye portion of the molecule. Also useful are such basic cationic dyestuffs as diphenylmethane, triphenylmethane, zanthane, acridine, azine, oxazine and thiazine dyes. Azoporphine dyestuffs are also useful in the invention.

Other dyestuffs which can form the dye portion of the aforementioned molecule include azo, polyazo, quinoline, thiazole, anthraquinone, naphtol, BON acid amide, phthalocyanine, triphendioxazine and triarylmethine, quinphthalone, methine, nitromethine, nitrodiphenyl-amine and the like.

The materials which may be readily dyed in accordance with the present invention include, for example, cellulosetriacetate, cellulose 2½-acetate, cotton and polyamides such as nylon 6, nylon 66 or nylon 12, and aromatic polyesters such as those from terephthalic acid and ethylene glycol, or 1,4-dimethylolcyclohexane and copolymers from terephthalic acid and isophthalic acid and ethylene glycol. The method of the invention is particularly suitable for dyeing hydrophobic materials.

In accordance with the method of the present invention an aqueous solution is formed having a basic salt of a water soluble dye therein. The dye has the formula (I) wherein the various letters, etc., are as set forth above. The aqueous solution is positioned adjacent to a material and sufficient dry heat is supplied to the material to convert the dye to a hydrophobic form thereof having one or more of the formulas (II), (III) (IV) or (V). Sufficient dry heat will generally be supplied if the material is heated to a temperature in the range from about 100° C. to about 250° C. for from about 0.1 minute to about 5 minutes. The basic salt may be an ammonium salt in which case the method can be carried out as stated. If the basic salt is an alkali metal salt, or for that matter is an ammonium salt, ammonium phosphate can be included in the aqueous solution prior to the applying of dry heat thereto. In the case when the basic salt is an alkali metal salt it is necessary to include ammonium phosphate in the aqueous solution prior to the applying of dry heat thereto.

Often the material adjacent to which the aqueous solution is positioned will be a hydrophobic material. However, the material can be hydrophilic, e.g., cotton, if the hydrophobic form of the dye, as set out above, is not subject to alkali attack. That is, if the dye is stable in alkaline solution or is protected from contact with alkaline solutions by the fabric.

The dyestuff of Formula I can be formulated in a relatively straightforward manner. For example, it may be formulated by reacting known dyestuffs having the formula:

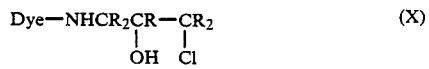

with an alpha amino acid such as glycine or substituted glycines having the formula $NHRCR_2CO_2H$ $2CO_2H$ to form compounds of the formula:

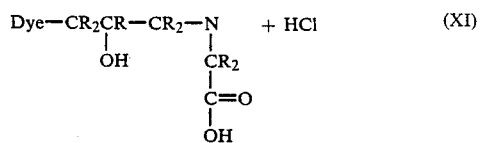

In formula (XI) the letters of formula (I) are: G is $CR_2CRCR_2$, E is OH, n is 1, m is 0, and Y is $CR_2COO$.

In one preferred embodiment of the present invention cyanuric chloride can be reacted with hydroxyethylglycine (or an R substituted hydroxyethylglycine with R being as previously defined) in the ratio of 1 mole of cyanuric chloride to 2 moles of hydroxyethyl-glycine to produce a dyestuff precursor of the formula:

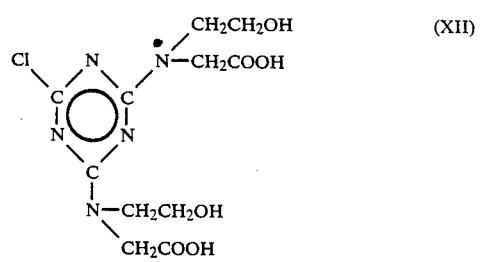

The precursor (XII) can be reacted with an amount of a compound of the formula Dye-NH₂, Dye-SH, Dye-OH, or Dye-CO₂H in a ratio of 1 mole of the Dye compound to one mole of the precursor. This leads to the desired dyestuff of the formula:

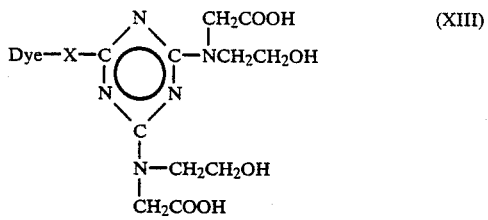

(XIII)

which corresponds to the formula (I) wherein n=0, the term Dye includes the aromatic ring from the cyanuric chloride precursor, Y is CH₂CH₂O, m =1, p =0, G is CH₂CH, R is H and E is OH. These reactions can be carried forth in a relatively straightforward manner.

The first reaction, between the cyanuric chloride and the hydroxyethylglycine or functionally equivalent compound, can generally be carried out in aqueous acetone solution at temperatures from about 0° C. to about 80° C. Other solvents may be appropriate in selected instances. In general the reactions can be carried out over a temperature range from about 0° C. to about 80° C. The reaction works particularly well in the presence of a base such as sodium bicarbonate or sodium carbonate.

The second reaction can generally be carried out under conditions very similar to those of the first reaction. The same solvents are useable along the same temperature ranges and the same base. Indeed, it is possible to simply allow the first reaction to proceed and then to add the Dye containing compound to the reaction mixture and allow the second reaction to proceed.

Conversely the dyestuffs and cyanuric chloride may be coreacted in an appropriate solvent as discussed above, followed by addition of the appropriate amount of hydroxyethylglycine.

The invention will be better understood by reference to the following examples.

EXAMPLE 1

Preparation of

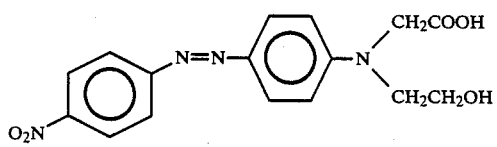

A quantity of p-nitroaniline, 13.8 grams was dissolved in a solution containing 30 ml of water, 30 ml of concentrated hydrochloric acid and 80 grams of ice. To this solution as added a solution containing 6.95 grams of sodium nitrite to complete the diazotization. The coupling solution of the aniline was prepared by dissolving 29.5 grams in 100 ml of water containing 10 ml of concentrated hydrochloric acid to which 150 grams of ice was added. The diazonium solution was added rapidly, with stirring, to the coupling solution at 5° C. and the resulting dark red pasty mixture was stirred. After one hour a solution of 40 grams of sodium acetate in 125 ml of water was added and the solid dye was collected.

The dye was dissolved in aqueous caustic (6 grams sodium hydroxide/liter), filtered and neutralized with hydrochloric acid to yield 30.5 grams of dyestuff. N.E. found 350; N.E. theory, 347. M.P. 162.66 (dec.).

EXAMPLE 2

Preparation of

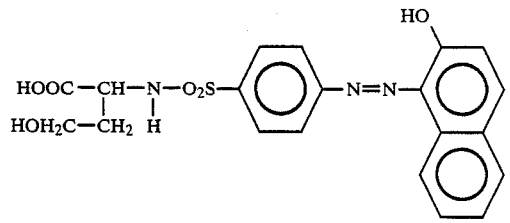

A quantity of sulfanilamide (27.3 grams) was dissolved in 28 ml of concentrate hydrochloric acid, 30 ml of water and 200 grams of ice. A solution of 7.0 grams sodium nitrite in 35 ml of water was added to complete the dizaotization. To a cooled solution (0° C) of β-naphtol (14.4 grams) dissolved in 300 ml water containing 25 grams of sodium hydroxide was added to the above diazonium solution. The resultant red-brown solution was allowed to stand at 0–5° C. for one hour. Addition of concentrated hydrochloric acid to a final pH value of 4 precipitated the dye as an orange powder.

A structurally similar dye was prepared from the sulfanilamide derived from hydroxyethyl glycine.

EXAMPLE 3

Preparation of

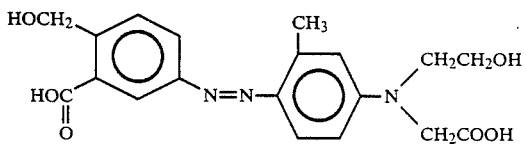

Procedure is identical to the conditions described in Example 1.

EXAMPLE 4

Preparation of

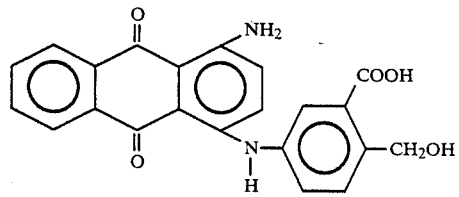

A quantity of aminophthalide (15.0 grams) was dissolved in 100 ml of 4% sodium hydroxide. To this solution was added a solution of 38.2 grams of bromamic acid, 26.8 grams sodium bicarbonate and 1 gram of cuprous chloride in 200 ml of water. The mix was stirred at 55° C. for 24 hours and filtered to remove insolubles. The pH of the filtrate was adjusted to a value of 2 whence an oil precipitated which solidified on stirring. The resulting bluish precipitate was collected and dried (33 grams).

The bluish powder was dissolved in 600 ml of water containing 21 ml of concentrated ammonia. The mixture was warmed to 60° C. and a solution of 25 grams of sodium hydrosulfite in 200 ml of water was added. The resulting flocculent brownish precipitate was collected and washed with water. The wet cake was dissolved in 1.21 of 8% sodium hydroxide to give a blue solution which was clarified by filtration. Acidification of the filtrates with 30 ml of concentrated hydrochloric acid precipitated the desired dyestuff (21 grams).

EXAMPLE 5

Preparation of

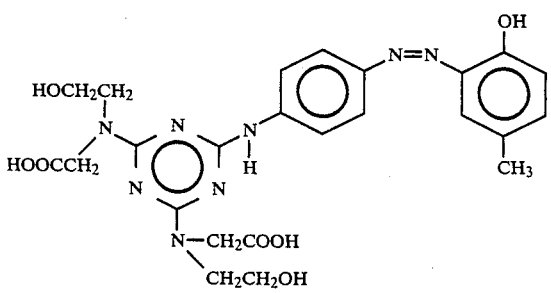

A 26 gram sample of purified Disperse Yellow 3 (C.I. 11855) is deacetylated in 250 ml of 10% sodium hydroxide at 90° C for 1 hour. The product is filtered and washed with water until the filtrate is neutral. The wet cake is suspended with vigorous stirring in 200 ml of water; adjusted to pH 5 with acetic acid and cooled to 5° C. A suspension of 18.4 grams of cyanuric chloride in 100 ml of ice water is prepared and added to the dye mixture. The pH is maintained at about 6 through additions of a solution of 8.4 grams of sodium bicarbonate in 30 ml of water. After 90 minutes the reaction is complete.

To the above suspension is added a cold solution of 29 grams of sodium hydroxethyl glycinate. The resultant mixture is maintained at about a pH of 6 thorugh alkali additgion at a temperature of about 10° C. When the theoretical amount is added and the pH remain stable the reaction mixture is neutralized to a pH of 3 with hydrochloric acid. The precipitated dyestuff is washed with cold water and dried.

EXAMPLE 6

Preparation of

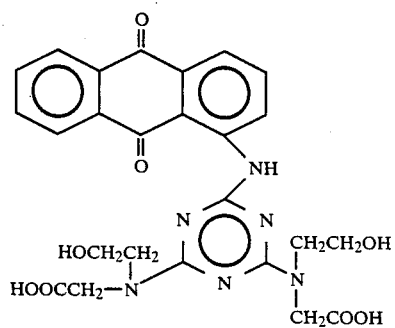

The dyestuff is prepared from 1-aminoanthraquinone by the procedure described in Example 5.

EXAMPLE b 7

Dyeing Materials

The dyestuffs of Examples 1-6 are used to dye fabrics of cellulosetriacetate, cellulose 2½-acetate, nylon 6, nylon 6,6, and aromatic polyesters. The dyestuffs are first individually dissolved in aqueous ammonium hydroxide to form the ammonium salts thereof. Thereafter, the solutions are individually contacted with samples of fabric. Them dry heat is applied to the fabric samples in a temperature range from 100° C. to 250° C. for from 0.1 minute to 5 minutes. The dyestuffs are thereby converted to the hydrophobic form whereupon they enter the fabric. The colors in the resulting dyed fabrics are substantially water and aqueous alkali-fast. The surface dye is easily washed off by a normal wash cycle at pH about 10.5–11.

INDUSTRIAL APPLICABILITY

The present invention provides a novel method of dyeing useful in dyeing fabrics and other materials as well as novel dyestuffs.

The aforegoing description of the present invention has been presented for purposes of illustration and description. It is not intended to be exhaustive or to limit the invention to the precise form disclosed, and many modifications and variations are possible in light of the above teaching. Thus, the scope of the invention is as defined by the claims appended hereto.

I claim:
1. A method of dyeing a material, comprising:
forming an aqueous a solution having a basic salt of a water soluble dye dissolved therein, said dye having a formula:

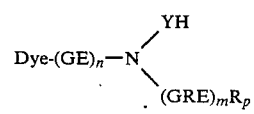

wherein:
n is 0 or 1;
m is 0 or 1;
m = 1 when n = 0;
p = 1 when m = 0;
the subscripts 1 and 0 indicating, respectively, the presence and absence of the substituent subscripted;
Y is $CR_2COO$, $CR_2CR_2COO$ or $CR_2CR_2CR_2COO$;
each R is independently hydrogen, methyl, ethyl, phenyl or phenyl substituted with methyl, ethyl, halo, cyano, ethynyl or nitro;
G is $CR$, $CR_2CR$, $CRCR_2$, $CR_2CR_2CR$, $CR_2CRCR_2$ or $CRCR_2CR_2$;
E is OH, SH or $NH_2$;
when G of GE includes more than one carbon atom the substituent E is attached to a carbon atom selected such that the two end carbon atoms of G are attached, one to the Dye and to the nitrogen; and
Dye indicates a color imparting dye moiety;
positioning said aqueous solution in contact with a material; and
applying sufficient dry heat to said material to converter said dye to a hydrophobic form thereof having the formula:

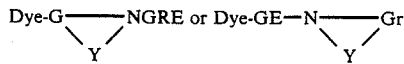

when n = 1, m = 1 and p = 0;

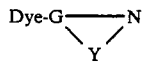

when n = 1, m = 0 and p = 1; and

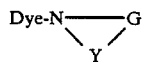

when n = 0, m = 1 and p = 0.

2. A method as set forth in claim 1, wherein said basic salt is an ammonium salt.

3. A method as set forth in claim 2, wherein said basic salt is an alkali metal or an ammonium salt and wherein an ammonium salt is included in said aqueous solution prior to said applying of dry heat thereto.

4. A method as set forth in claim 1 wherein, prior to applying of said dry heat, an aqueous solution is maintained in contact with said material for a time sufficient for said aqueous solution to be adsorbed by said material.

5. A method as set forth in claim 1, wherein said material comprises a hydrophobic material which is penetrated by said hydrophobic form of said dye.

6. A method as set forth in claim 1, wherein said material comprises cotton.

7. A method as set forth in claim 1 which consists essentially of the steps set forth therein.

* * * * *